(12) United States Patent
Sun

(10) Patent No.: US 12,229,074 B2
(45) Date of Patent: Feb. 18, 2025

(54) COMMUNICATION LINK UPDATE METHOD AND APPARATUS, AND RELATED DEVICE

(71) Applicant: SUZHOU METABRAIN INTELLIGENT TECHNOLOGY CO., LTD., Jiangsu (CN)

(72) Inventor: Minggang Sun, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/700,757

(22) PCT Filed: Sep. 23, 2022

(86) PCT No.: PCT/CN2022/121129
§ 371 (c)(1),
(2) Date: Apr. 12, 2024

(87) PCT Pub. No.: WO2023/173718
PCT Pub. Date: Sep. 21, 2023

(65) Prior Publication Data
US 2024/0338335 A1 Oct. 10, 2024

(30) Foreign Application Priority Data
Mar. 17, 2022 (CN) .......................... 202210260913.1

(51) Int. Cl.
*G06F 13/24* (2006.01)
*G06F 13/42* (2006.01)
(52) U.S. Cl.
CPC ................................. *G06F 13/4221* (2013.01)
(58) Field of Classification Search
CPC .................................................. G06F 13/4221
See application file for complete search history.

(56) References Cited

U.S. PATENT DOCUMENTS 4,406,004 A * 9/1983 Hall .................. H04Q 11/04
370/522
8,650,429 B1 * 2/2014 Starr ............... H03K 19/01837
713/400
(Continued)

FOREIGN PATENT DOCUMENTS

CN 103797732 A 5/2014
CN 104823167 A 8/2015
(Continued)

OTHER PUBLICATIONS

PCT/CN2022/121129, International Search Report, Date Mailed Dec. 15, 2022.
(Continued)

*Primary Examiner* — Henry Tsai
*Assistant Examiner* — Kim T Huynh
(74) *Attorney, Agent, or Firm* — Cooper Legal Group, LLC

(57) ABSTRACT

Disclosed in the present application is a communication link update method. The method comprises: traversing registers in a target communication link, so as to determine a DownTrain register; setting a prohibition flag bit in the DownTrain register; reading configuration information of each register in the target communication link, so as to generate a configuration file; and updating each communication link by using the configuration file. By means of applying the technical solution provided in the present application, firstly, a DownTrain register is searched for in a target communication link, and then, a prohibition flag bit is set for the DownTrain register, such that in the case of partial Lane Down (shutdown) of the communication link, the entire link is shut down.

15 Claims, 2 Drawing Sheets

(56) References Cited

U.S. PATENT DOCUMENTS

| | | | |
|---|---|---|---|
| 10,255,151 B1 | 4/2019 | Levin et al. | |
| 2005/0021699 A1* | 1/2005 | Kota | G06F 15/17337 |
| | | | 709/221 |
| 2006/0136338 A1* | 6/2006 | Maor | G06F 21/74 |
| | | | 705/51 |
| 2013/0147609 A1* | 6/2013 | Griffin | G06K 7/10356 |
| | | | 340/10.5 |
| 2017/0083057 A1 | 3/2017 | Bettiga et al. | |
| 2018/0000344 A1* | 1/2018 | Melodia | A61B 5/0026 |
| 2018/0189126 A1* | 7/2018 | Sugimoto | G06F 11/0793 |
| 2022/0382696 A1* | 12/2022 | Jeon | G06F 13/4221 |
| 2023/0252540 A1* | 8/2023 | Rathod | G06Q 30/0607 |
| | | | 705/26.25 |

FOREIGN PATENT DOCUMENTS

| | | |
|---|---|---|
| CN | 105700967 A | 6/2016 |
| CN | 106802876 A | 6/2017 |
| CN | 109885420 A | 6/2019 |
| CN | 113438171 A | 9/2021 |
| CN | 113986796 A | 1/2022 |
| CN | 114153477 A | 3/2022 |
| CN | 114153779 A | 3/2022 |
| CN | 114356811 A | 4/2022 |

OTHER PUBLICATIONS

PCT/CN2022/121129, Written Opinion, Date Mailed Dec. 15, 2022. English Translation.

First Office Action of corresponding CN priority application (CN202210260913.1), Date Mailed Apr. 22, 2022.

Notification to Grant Patent Right for Invention of corresponding CN priority application (CN202210260913.1), Date Mailed May 7, 2022.

* cited by examiner

COMMUNICATION LINK UPDATE METHOD AND APPARATUS, AND RELATED DEVICE

This application is the national phase application of International Application No. PCT/CN2022/121129, filed Sep. 23, 2022, which claims priority to Chinese Patent Application No. 202210260913.1, filed on Mar. 17, 2022 in China National Intellectual Property Administration and entitled "Communication Link Update Method and Apparatus, and Related Device". The contents of International Application No. PCT/CN2022/121129 and Chinese Patent Application No. 202210260913.1 are incorporated herein by reference in their entireties.

FIELD

The present application relates to the technical field of communications, in particular to a communication link update method, a communication link update apparatus and device, and a computer-readable storage medium.

BACKGROUND

In the storage field, with the popularization of NVMe solid state drives (SSD), a hard disk frame based on a peripheral component interconnect express (PCIe) direct connection is also developed. A storage controller connects a hard disk expansion cabinet and the hard disk frame by using a PCIe cable, generally a Mini-SAS high density (HD) (connector) cable.

The inventors realized that in order to meet performance requirements, a PCIe bandwidth between the controller and the expansion cabinet is generally more than ×16, while the bandwidth of a common Mini-SAS cable is ×4. Therefore, the controller and the expansion cabinet are often connected by using a plurality of cables. Since a plurality of cables are used, each cable may be plugged or fail. When a non-Lane0 cable of PCIe is disconnected, the PCIe Link will fail, and a PCIe link training and status state machine (LTSSM), which is a core state machine of PCIe, will jump to Recovery, thus reducing to the supported bandwidth. For example, when one of four cables fails, the Link bandwidth will be reduced to ×8, but the link will not be shut down or disconnected. An upper application will not perceive the process, which is completely controlled by the PCIe LTSSM.

As mentioned above, when the non-Lane0 cable is plugged or interrupted, the PCIe LTSSM enters a Recover process. However, the link is not declared shut down, and a link layer of PCIe will continue to retransmit unacknowledged messages due to the lack of acknowledgment (ACK) from the opposite end. At this moment, there are new data transmission requests to be generated later. Tag uses 5 bits by default, and will be multiplexed in this scenario. That is, for the same BDF device (PCIe device), a certain memory address where data is read and written by a Tag flag is confirmed. If this flag is multiplexed, read-write errors will be produced. For storage devices, data inconsistency is a problem. That is, after a central processing unit (CPU) sends data, the data received at an SSD side is misaligned.

Therefore, how to effectively avoid the problem of inconsistent data sending and receiving in the process of data transmission is an urgent problem to be solved by those skilled in the art.

SUMMARY

In a first aspect, the present application provides a communication link update method, including:

traversing registers in a target communication link, so as to determine a DownTrain register;

setting a prohibition flag bit in the DownTrain register;

reading configuration information of each register in the target communication link, so as to generate a configuration file; and updating each communication link by using the configuration file.

In some embodiments, the traversing registers in a target communication link, so as to determine a DownTrain register includes:

traversing the registers in the target communication link by using a PLX_SDK toolkit, so as to determine the DownTrain register.

In some embodiments, before the traversing registers in a target communication link, so as to determine a DownTrain register, the method further includes:

establishing a connection with the target communication link by using a Total Phase tool.

In some embodiments, the establishing a connection with the target communication link by using a Total Phase tool includes:

establishing a connection with an inter-integrated circuit (I2C) interface of the target communication link by using the Total Phase tool.

In some embodiments, the updating each communication link by using the configuration file includes:

filling the configuration file to the communication link when the communication link is a factory device.

In some embodiments, the updating each communication link by using the configuration file includes:

generating, when the communication link is an online device, an upgrade task according to the configuration file, and sending the upgrade task to the communication link, whereby the communication link is updated according to a configuration file in the upgrade task.

In some embodiments, the method further includes: prohibiting DownTrain by setting the prohibition flag bit in the case of Lane Down, and shutting down the entire link.

In some embodiments, the updating each communication link by using the configuration file includes:

updating each communication link of the same type as the target communication link by using the configuration file.

In some embodiments, the updating each communication link by using the configuration file includes:

correspondingly configuring each register in each communication link by using configuration information in the configuration file, and deleting original configuration information.

In some embodiments, the generating, when the communication link is an online device, an upgrade task according to the configuration file, and sending the upgrade task to the communication link, whereby the communication link is updated according to a configuration file in the upgrade task includes:

attaching the configuration file to an upgrade instruction, and issuing the upgrade instruction to each communication link, whereby each communication link obtains the configuration file through task analysis and is automatically updated based on the configuration file.

In a second aspect, the present application also discloses a communication link update apparatus, including:

a register traversal module, configured to traverse registers in a target communication link, so as to determine a DownTrain register;

a flag bit setting module, configured to set a prohibition flag bit in the DownTrain register;

a configuration file generation module, configured to read configuration information of each register in the target communication link, so as to generate a configuration file; and a communication link update module, configured to update each communication link by using the configuration file.

In some embodiments, the register traversal module is configured to traverse the registers in the target communication link by using a PLX_SDK toolkit, so as to determine the DownTrain register.

In a third aspect, the present application also discloses a communication link update device, including:

a memory, configured to store computer-readable instructions; and one or more processors, configured to implement the steps of any one of the above-mentioned communication link update methods when executing the computer-readable instructions.

In a fourth aspect, the present application also discloses a non-volatile computer-readable storage medium. The non-volatile computer-readable storage medium stores computer-readable instructions thereon. When the computer-readable instructions are executed by one or more processors, the steps of any one of the above-mentioned communication link update methods are implemented.

Details of one or more embodiments of the present application are set forth in the following drawings and description. Other features and advantages of the present application will become apparent from the specification, the drawings and the claims.

BRIEF DESCRIPTION OF THE DRAWINGS

In order to more clearly explain the prior art and the technical solution in embodiments of the present application, a brief introduction of the prior art and the drawings required to be used in the description of the embodiments of the present application will be given below. Definitely, the following drawings relating to the embodiments of the present application describe only a part of the embodiments of the present application, other drawings might be obtained according to the provided drawings without creative work for those of ordinary skill in the art, and the obtained other drawings also fall within the scope of protection of the present application.

DETAILED DESCRIPTION

Figure 1:
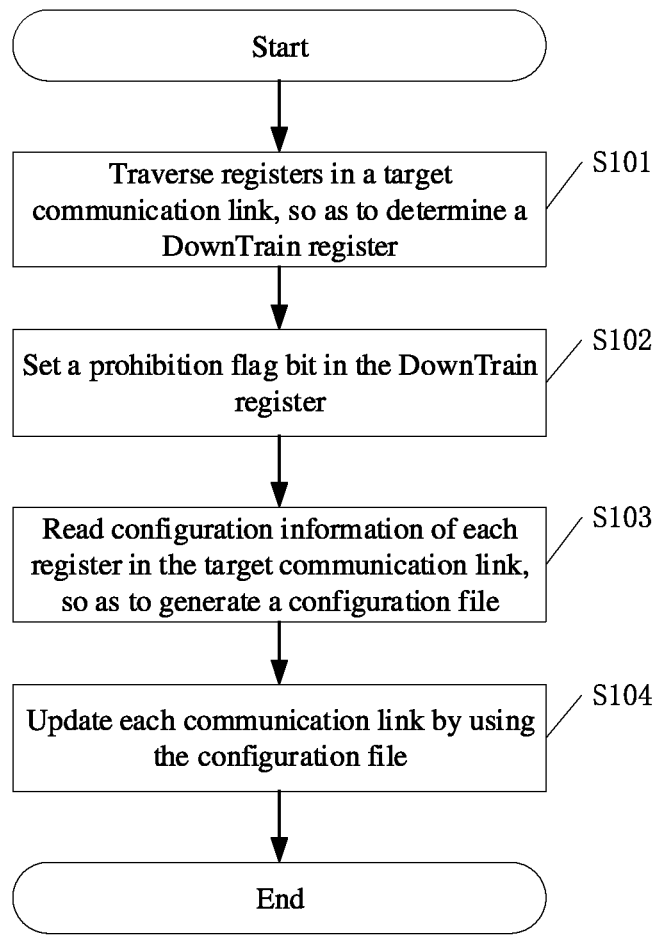
FIG. 1 is a schematic flow chart of a communication link update method according to one or more embodiments of the present application.

The core of the present application is to provide a communication link update method. The communication link update method might effectively avoid the problem of inconsistent receiving and sending data in the data transmission process. Another core of the present application is to provide a communication link update apparatus and device and a computer-readable storage medium, which also have the above-mentioned beneficial effects.

In order to more clearly and completely describe the technical solution in the embodiments of the present application, the technical solution in the embodiments of the present application will be introduced in conjunction with the drawings in the embodiments of the present application. Obviously, the described embodiments are only a part of the embodiments of the present application, rather than all the embodiments. Based on the embodiments of the present application, all other embodiments obtained by those of ordinary skill in the art without creative work shall fall within the protection scope of the present application.

In order to meet performance requirements, a PCIe bandwidth between a controller and an expansion cabinet is generally more than ×16, while the bandwidth of a common Mini-SAS cable is ×4. Therefore, the controller and the expansion cabinet are often connected by using a plurality of cables. Since a plurality of cables are used, each cable may be plugged or fail. When a non-Lane0 cable of PCIe is disconnected, PCIe Link will fail, and a PCIe LTSSM, which is a core state machine of PCIe, will jump to Recovery, thus reducing to the supported bandwidth. For example, when one of four cables fails, Link bandwidth will be reduced to ×8, but the link will not be shut down or disconnected. An upper application will not perceive the process, which is completely controlled by the PCIe LTSSM.

As mentioned above, when the non-Lane0 cable is plugged or interrupted, the PCIe LTSSM enters a Recover process. However, the link is not declared shut down, and a link layer of PCIe will continue to retransmit unconfirmed messages before obtaining the ack of an opposite end. At this moment, there are new data transmission requests to be generated later. Tag uses 5 bits by default, and will be multiplexed in this scenario. That is, for the same BDF device (PCIe device), a certain memory address where data is read and written by a Tag flag is confirmed. If this flag is multiplexed, read-write errors will be produced. For storage devices, data inconsistency is a problem. That is, after a CPU sends data, the data received at an SSD side is misaligned.

Therefore, in order to solve the above-mentioned technical problems, the present application provides a communication link update method. Based on the characteristics of a DownTrain register in a communication link, when DownTrain is allowed, Link will enter a Recovery process in the case of partial Lane Down of the communication links. When DownTrain is prohibited, the entire Link will be shut down in the case of partial Lane Down of the communication link. Based on this, the DownTrain register may be searched for in a target communication link, and then, a prohibition flag bit is set for the DownTrain register, whereby in the case of partial Lane Down (shutdown) of the communication link, the entire link is shut down, thus effectively avoiding the problem of inconsistent data sending and receiving in a data transmission process. On this basis, a configuration file is generated based on configuration information of the modified register, and the batch update of communication links might be realized by using the configuration file.

Embodiments of the present application provide a communication link update method.

Referring to FIG. 1, FIG. 1 is a schematic flow chart of a communication link update method according to the present application. The communication link update method may include:

S101: traversing registers in a target communication link, so as to determine a DownTrain register.

The purpose of this step is to realize register traversal to determine a DownTrain register in a target communication link. The target communication link is a communication link to be updated, and the specific type of the target communication link does not affect the implementation of the technical solution. For example, the target communication link may be a PCIe communication link. The present application is not limited thereto.

In some embodiments, a communication link is provided with a plurality of registers configured to realize data communication, and the DownTrain register is one of the registers. For different types of communication links, different types of registers may be used as the DownTrain register. For example, in a PCIe communication link, a BE4 register is generally used as the DownTrain register.

Further, based on the inherent characteristics of the DownTrain register: when DownTrain is allowed, Link will enter the Recovery process in the case of partial Lane Down in the communication link. When DownTrain is prohibited, in the case of partial Lane Down of the communication link, the entire link will be shut down. Therefore, the development direction of Link in the target communication link may be controlled by setting different flag bits for the DownTrain register.

S102: setting a prohibition flag bit in the DownTrain register.

The purpose of this step is to set a flag bit in a DownTrain register, that is, to set a prohibition flag bit for the DownTrain register. As mentioned above, when DownTrain is prohibited, in the case of partial Lane Down of the communication link, the entire link will be shut down. Therefore, the prohibition flag bit may be set in the DownTrain register to prohibit DownTrain, whereby in the case of partial Lane Down of the communication link, the entire link is shut down. At this moment, the data communication is interrupted, and the problem of inconsistent data sending and receiving in data communication will inevitably not occur again.

The prohibition flag bit is set in the DownTrain register. In some embodiments, the flag bit may be set to 0, where 0 indicates prohibited and 1 indicates allowed.

S103: reading configuration information of each register in the target communication link, so as to generate a configuration file.

The purpose of this step is to generate a configuration file based on configuration information of registers. The configuration file is configured to realize batch update of communication links. After the flag bit in the DownTrain register is set to a prohibited state, configuration information of each register in the target communication link may be read, which refers to configuration information of all registers in the target communication link, so as to generate corresponding configuration files based on the configuration information.

S104: updating each communication link by using the configuration file.

The purpose of this step is to realize batch update of communication links. On the basis of obtaining a configuration file, each communication link may be updated by using the configuration file. The update process may be: correspondingly configuring each register in the communication link by using configuration information in the configuration file, and deleting original configuration information, thereby realizing batch update of the communication links.

It should be noted that the communication links updated in batches here refer to communication links of the same type as the target communication link.

Furthermore, the generated configuration file may be stored in a corresponding storage space, whereby the configuration file may be directly retrieved from the storage space during the update process of a new communication link, thereby realizing the rapid update of the communication link.

It might be seen that according to the communication link update method provided by the present application, based on the characteristics of a DownTrain register in a communication link, when DownTrain is allowed, Link will enter a Recovery process in the case of partial Lane Down of the communication link. When DownTrain is prohibited, the entire Link will be shut down in the case of partial Lane Down of the communication link. Based on this, the DownTrain register may be searched for in a target communication link, and then, a prohibition flag bit is set for the DownTrain register, whereby in the case of partial Lane Down (shutdown) of the communication link, the entire link is shut down, thus effectively avoiding the problem of inconsistent data sending and receiving in a data transmission process. On this basis, a configuration file is generated based on configuration information of the modified register, and the batch update of communication links might be realized by using the configuration file.

In some embodiments of the present application, the traversing registers in a target communication link, so as to determine a DownTrain register may include: traversing the registers in the target communication link by using a PLX_SDK toolkit, so as to determine the DownTrain register.

Embodiments of the present application provide a register traversal method, which is realized based on a PLX_SDK toolkit. In some embodiments, the PLX_SDK toolkit provides some well-tested tools to compile, debug, and drive user programs. In addition, modifications to the flag bits in the DownTrain register may also be implemented by using gadgets in the PLX_SDK toolkit.

It will be understood that the PLX_SDK toolkit is only an implementation mode provided by the embodiments of the present application, and is not unique. The modifications may also be implemented by other types of tools, which might be set by those skilled in the art according to actual conditions. The present application is not limited thereto.

In some embodiments of the present application, before the traversing registers in a target communication link, so as to determine a DownTrain register, the method may further include: establishing a connection with the target communication link by using a Total Phase tool.

It should be noted that before the register traversal of the target communication link, a connection relationship may be established with the target communication link. The establishment process of the connection relationship may be implemented by a Total Phase tool. The Total Phase tool provides a global engine embedded system development tool.

Similarly, the Total Phase tool is only an implementation mode provided by the embodiments of the present application, and is not unique. The establishment process may also be implemented by other types of tools, which might be set by those skilled in the art according to actual conditions. The present application is not limited thereto.

In some embodiments of the present application, the establishing a connection with the target communication link by using a Total Phase tool may include: establishing a connection with an I2C interface of the target communication link by using the Total Phase tool.

In some embodiments, when the connection with the target communication link is established by using the Total Phase tool, a connection relationship with a communication interface: I2C interface of the target communication link may be established. Definitely, the selection of the I2C interface is only an implementation form provided by the embodiments of the present application, and is not unique. The communication interface might be selected by those skilled in the art according to actual conditions. The present application is not limited thereto.

It will be understood that communication links may include a communication link that has been delivered but not put into use, that is, the following factory device, and a communication link that has been delivered and put into use, that is, the following online device. Therefore, different communication link update modes may be set for different usage scenarios, as described in the following two embodiments.

In some embodiments of the present application, the updating each communication link by using the configuration file may include: filling the configuration file to the communication link when the communication link is a factory device.

Embodiments of the present application provide a communication link update method for the communication link that has been delivered but not put into use. In some embodiments, in the production process, the configuration file may be directly filled into the communication link to update the communication link, and then the communication link is put into use.

In some embodiments of the present application, the updating each communication link by using the configuration file may include: generating, when the communication link is an online device, an upgrade task according to the configuration file, and sending the upgrade task to the communication link, whereby the communication link is updated according to a configuration file in the upgrade task.

Embodiments of the present application provide a communication link update method for the communication link that has been delivered and put into use. In some embodiments, an upgrade task may be generated based on the configuration file. That is, the configuration file is attached to an upgrade instruction, and the upgrade instruction is issued to each communication link, whereby each communication link obtains the configuration file through task analysis and is automatically updated based on the configuration file.

On the basis of the above-mentioned embodiments, embodiments of the present application provide a communication link update method for a PCIe communication link, and the implementation process thereof may include:

(1) connecting an 8733I2C interface by using a Total Phase tool;
(2) connecting 8733 by using PLX_SDK software;
(3) reading an 8733 configuration register;
(4) prohibiting an LTSSM from Recovery to L0 in the scenario of Lane loss, checking an 8733 data sheet to determine that a 0xBE4 register is a DownTrain register, and prohibiting DownTrain; and
(5) exporting register configuration information to generate a configuration file for production and filling of a new device, issuing an upgrade task by using the configuration file as 8733 firmware for launched products, and updating the launched products.

It might be seen that according to the communication link update method provided by the embodiments of the present application, based on the characteristics of a DownTrain register in a communication link, when DownTrain is allowed, Link will enter a Recovery process in the case of partial Lane Down of the communication link. When DownTrain is prohibited, the entire Link will be shut down in the case of partial Lane Down of the communication link. Based on this, the DownTrain register may be searched for in a target communication link, and then, a prohibition flag bit is set for the DownTrain register, whereby in the case of partial Lane Down (shutdown) of the communication link, the entire link is shut down, thus effectively avoiding the problem of inconsistent data sending and receiving in a data transmission process. On this basis, a configuration file is generated based on configuration information of the modified register, and the batch update of communication links might be realized by using the configuration file.

Figure 2:
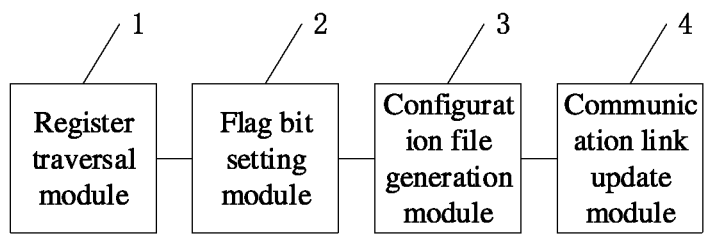
FIG. 2 is a schematic structural diagram of a communication link update apparatus according to one or more embodiments of the present application.

The present application also provides a communication link update apparatus. Referring to FIG. 2, FIG. 2 is a schematic structural diagram of a communication link update apparatus according to the present application. The communication link update apparatus may include:

a register traversal module 1, configured to traverse registers in a target communication link, so as to determine a DownTrain register;

a flag bit setting module 2, configured to set a prohibition flag bit in the DownTrain register;

a configuration file generation module 3, configured to read configuration information of each register in the target communication link, so as to generate a configuration file; and a communication link update module 4, configured to update each communication link by using the configuration file.

It might be seen that according to the communication link update apparatus provided by the embodiments of the present application, based on the characteristics of a DownTrain register in a communication link, when DownTrain is allowed, Link will enter a Recovery process in the case of partial Lane Down of the communication link. When DownTrain is prohibited, the entire Link will be shut down in the case of partial Lane Down of the communication link. Based on this, the DownTrain register may be searched for in a target communication link, and then, a prohibition flag bit is set for the DownTrain register, whereby in the case of partial Lane Down (shutdown) of the communication link, the entire link is shut down, thus effectively avoiding the problem of inconsistent data sending and receiving in a data transmission process. On this basis, a configuration file is generated based on configuration information of the modified register, and the batch update of communication links might be realized by using the configuration file.

In some embodiments of the present application, the register traversal module 1 may be configured to traverse the registers in the target communication link by using a PLX_SDK toolkit, so as to determine the DownTrain register.

In some embodiments of the present application, the communication link update apparatus may further include: a connection establishment module, configured to establish a connection with the target communication link by using a Total Phase tool before the traversing registers in a target communication link, so as to determine a DownTrain register.

In some embodiments of the present application, the connection establishment module may be configured to establish a connection with an I2C interface of the target communication link by using the Total Phase tool.

In some embodiments of the present application, the communication link update module 4 may be configured to fill the configuration file to the communication link when the communication link is a factory device.

In some embodiments of the present application, the communication link update module 4 may be configured to generate, when the communication link is an online device, an upgrade task according to the configuration file, and send the upgrade task to the communication link, whereby the communication link is updated according to a configuration file in the upgrade task.

For the introduction of the apparatus provided by the present application, reference is made to the above-mentioned method embodiments, and the present application will not be repeated herein.

Figure 3:
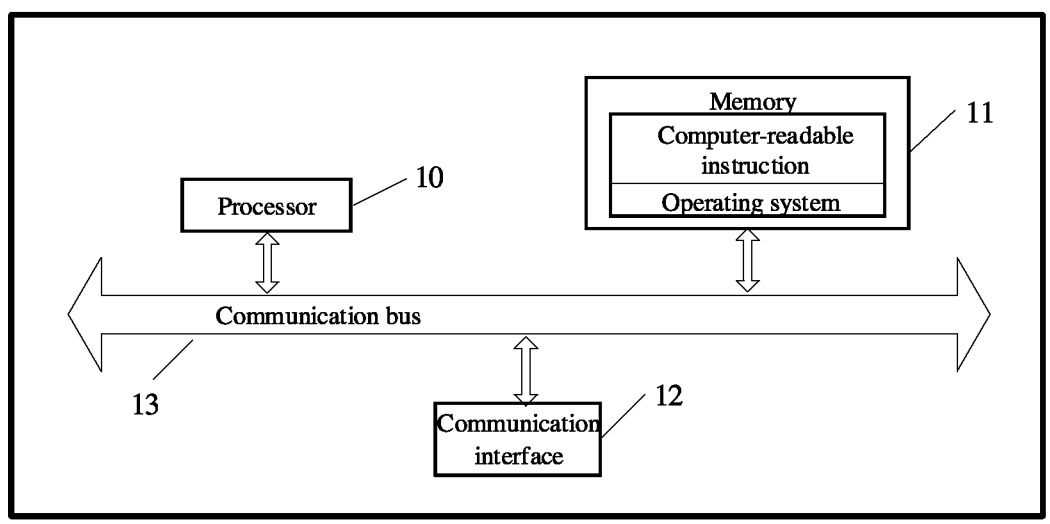
FIG. 3 is a schematic structural diagram of a communication link update device according to one or more embodiments of the present application.

The present application also provides a communication link update device. Referring to FIG. 3, FIG. 3 is a schematic structural diagram of a communication link update device according to the present application. The communication link update device may include:
a memory, configured to store computer-readable instructions; and
one or more processors, configured to implement the steps of any one of the above-mentioned communication link update methods when executing the computer-readable instructions.

FIG. 3 shows a schematic diagram of a composition structure of a communication link update device. The communication link update device may include: a processor 10, a memory 11, a communication interface 12, and a communication bus 13. The processor 10, the memory 11, and the communication interface 12 all communicate with each other through the communication bus 13.

In embodiments of the present application, the processor 10 may be a CPU, an application-specific integrated circuit, a digital signal processor, a field programmable gate array, or another programmable logic device.

The processor 10 may invoke programs stored in the memory 11. In some embodiments, the processor 10 may perform operations in embodiments of a communication link update method.

The memory 11 is configured to store one or more programs. The programs may include program code. The program code includes computer operation instructions. In the embodiments of the present application, the memory 11 stores at least steps for implementing the communication link update method provided in any of the above-mentioned embodiments.

In a possible implementation, the memory 11 may include a stored program area and a stored data area. The stored program area may store an operating system, an application program required for at least one function, and the like. The storage data area may store data created during use.

In addition, the memory 11 may include a high-speed random access memory and may also include a non-volatile memory such as at least one disk storage device or another volatile solid-state storage device.

The communication interface 12 may be an interface of a communication module for connecting with other devices or systems.

Definitely, it should be noted that the structure shown in FIG. 3 is not limited to the communication link update device in the embodiments of the present application. In practical applications, the communication link update device may include more or fewer components than those shown in FIG. 3, or may combine certain components.

The present application also provides a non-volatile computer-readable storage medium. The non-volatile computer-readable storage medium stores computer-readable instructions thereon. When the computer-readable instructions are executed by a processor, the steps of any one of the above-mentioned communication link update methods may be implemented.

The computer-readable storage medium may include: a U disk, a removable hard disk, a read-only memory (ROM), a random access memory (RAM), a magnetic disk or an optical disk, and other media capable of storing program code.

For the introduction of the computer-readable storage medium provided by the present application, reference is made to the above-mentioned method embodiments, and the present application will not be repeated herein.

Various embodiments are described in the description in a progressive manner. Each embodiment focuses on differences from the other embodiments. The same or similar parts of the various embodiments may be referred to each other. As for the apparatus disclosed in the embodiments, since the apparatus corresponds to the method disclosed in the embodiments, the description is relatively simple. The relevant part may be described with reference to the method section.

Those skilled in the art may be further aware that, units and algorithm steps of the examples described in the disclosed embodiments in this specification may be implemented by electronic hardware, computer software, or a combination thereof. To clearly describe the interchangeability between the hardware and the software, the has generally described compositions and steps of the examples based on functions. Whether the functions are executed in the manner of hardware or software depends on particular applications and design constraint conditions of the technical solutions. Those skilled in the art may use different methods to implement the described functions for each particular application, but it is not to be considered that the implementation goes beyond the scope of the present application.

The steps of the method or algorithm described in connection with the embodiments disclosed herein may be implemented directly in hardware, a software module executed by a processor, or a combination of hardware and software. The software module may be placed in a RAM, a memory, a ROM), an electrically programmable ROM, an electrically erasable programmable ROM, a register, a hard disk, a removable disk, a CD-ROM, or any other form of storage medium known in the art.

The technical solution provided by the present application has been introduced above in detail. The principles and implementations of the present application have been set forth herein using specific examples. The above embodiments have been set forth only to aid in the understanding of the method and core ideas of the present application. It should be noted that those of ordinary skill in the art may make numerous improvements and modifications to the present application without departing from the principles of the present application. Such improvements and modifications are intended to be within the scope of protection of the present application.

What is claimed is:

1. A communication link update method, comprising:
traversing registers in target communication links, so as to determine DownTrain registers;

setting a prohibition flag bit in each of the DownTrain registers to prohibit Down Train, such that communication links with partial Lane Down are shut down entirely;

reading configuration information of each register of the registers in the target communication links, so as to generate a configuration file; and generating an upgrade task according to the configuration file, and sending the upgrade task to the communication links, whereby the communication links are updated according to the configuration file in the upgrade task.

2. The communication link update method according to claim 1, wherein the traversing registers in the target communication links comprises:

traversing the registers in the target communication links by using a PLX_SDK toolkit.

3. The communication link update method according to claim 1, wherein before the traversing registers in the target communication links, so as to determine the DownTrain registers, the communication link update method further comprises:

establishing a connection with the target communication links by using a Total Phase tool.

4. The communication link update method according to claim 3, wherein the establishing the connection with the target communication links by using the Total Phase tool comprises:

establishing a connection with an inter-integrated circuit (I2C) interface of the target communication links by using the Total Phase tool.

5. The communication link update method according to claim 1, wherein each of the communication links of a same type as the target communication links is updated according to the configuration file in the upgrade task.

6. The communication link update method according to claim 5, further comprising:

correspondingly configuring each register in each communication link of the communication links by using configuration information in the configuration file, and deleting original configuration information.

7. The communication link update method according to claim 1, wherein the generating the upgrade task according to the configuration file, and sending the upgrade task to the communication links, whereby the communication links are updated according to the configuration file in the upgrade task comprises:

attaching the configuration file to an upgrade instruction, and issuing the upgrade instruction to each communication link of the communication links, whereby each communication link of the communication links obtains the configuration file through task analysis and is automatically updated based on the configuration file.

8. A communication link update device, comprising:

a memory, configured to store computer-readable instructions; and one or more processors, upon execution of the computer-readable instructions, the one or more processors are configured for:

traversing registers in target communication links, so as to determine DownTrain registers;

setting a prohibition flag bit in each of the DownTrain registers to prohibit DownTrain, such that communication links with partial Lane Down are shut down entirely;

reading configuration information of each register of the registers in the target communication links, so as to generate a configuration file; and generating an upgrade task according to the configuration file, and sending the upgrade task to the communication links, whereby the communication links are updated according to the configuration file in the upgrade task.

9. A non-volatile computer-readable storage medium, storing computer-readable instructions thereon, wherein when the computer-readable instructions are executed by one or more processors, the one or more processors are configured for:

traversing registers in target communication links, so as to determine DownTrain registers;

setting a prohibition flag bit in each of the DownTrain registers to prohibit Down Train, such that communication links with partial Lane Down are shut down entirely;

reading configuration information of each register of the registers in the target communication links, so as to generate a configuration file; and generating an upgrade task according to the configuration file, and sending the upgrade task to the communication links, whereby the communication links are updated according to the configuration file in the upgrade task.

10. The communication link update method according to claim 1, wherein the target communication links comprise peripheral component interconnect express (PCIe) communication links.

11. The communication link update method according to claim 1, further comprising:

in response to the prohibition flag bit being set to 0, prohibiting the DownTrain registers, and in response to the prohibition flag bit being set to 1, allowing the DownTrain registers.

12. The communication link update method according to claim 1, further comprising:

storing the configuration file into a corresponding storage space, and retrieving the configuration file from the corresponding storage space to update the communication links.

13. The communication link update device according to claim 8, wherein upon execution of the computer-readable instructions, the one or more processors are further configured for:

traversing the registers in the target communication links by using a PLX_SDK toolkit, so as to determine the DownTrain registers.

14. The communication link update device according to claim 8, wherein upon execution of the computer-readable instructions, the one or more processors are further configured for:

establishing a connection with the target communication links by using a Total Phase tool.

15. The communication link update device according to claim 14, wherein upon execution of the computer-readable instructions, the one or more processors are further configured for:

establishing a connection with an inter-integrated circuit (I2C) interface of the target communication links by using the Total Phase tool.

* * * * *